United States Patent [19]

Nakahashi et al.

[11] Patent Number: 5,112,916
[45] Date of Patent: May 12, 1992

[54] OLEFIN POLYMER AND A RESIN COMPOSITION CONTAINING THE SAME

[75] Inventors: Junichi Nakahashi; Itaru Natori; Kenichi Hinoue; Nobutaka Ochiai, all of Nobeoka, Japan

[73] Assignee: Asahi Kasei Kogyo Kabushiki Kaisha, Osaka, Japan

[21] Appl. No.: 445,645

[22] PCT Filed: Mar. 4, 1989

[86] PCT No.: PCT/JP89/00235

§ 371 Date: Nov. 6, 1990

§ 102(e) Date: Nov. 6, 1989

[87] PCT Pub. No.: WO89/08120

PCT Pub. Date: Sep. 8, 1989

[51] Int. Cl.⁵ .................................................. G08F 8/90
[52] U.S. Cl. ........................................ 525/183; 525/428
[58] Field of Search ................................ 525/183, 426

[56] References Cited

U.S. PATENT DOCUMENTS 3,288,714 11/1966 Osuch .
3,770,849 11/1973 Matzner et al. .
4,174,358 11/1979 Epstein .
4,473,686 9/1984 Grigo et al. .

FOREIGN PATENT DOCUMENTS 0082601 6/1983 European Pat. Off. .
1356802 6/1974 United Kingdom .

*Primary Examiner*—Bernard Lipman
*Attorney, Agent, or Firm*—Armstrong & Kubovcik

[57] ABSTRACT

Disclosed is an olefin polymer of having a number average molecular weight of 500 to 50,000 and having an acid anhydride group only at a terminal thereof, and a resin composition containing the olefin polymer. When the olefin polymer having an acid anhydride group only at a terminal thereof is blended with a polyamide, a resin composition having extremely improved toughness, particularly in tensile elongation as compared to the polyamide alone can be obtained. Further, when a ternary composition is prepared by blending the olefin polymer of the present invention as component (A), a polyamide as component (B) and an olefin-containing polymer other than the olefin polymer [component (A)] as component (C), component (A) acts as a compatibility agent between component (B) and a component (C), so that the efficiency of dispersion of component (C) in component (B), or of component (B) in component (C), is improved, and a resin composition having markedly improved toughness (tensile elongation and impact resistance), LLC resistance and low water absorption properties can be obtained.

2 Claims, 3 Drawing Sheets

OLEFIN POLYMER AND A RESIN COMPOSITION CONTAINING THE SAME

TECHNICAL FIELD

The present invention relates to a novel olefin polymer useful as a modifier for thermoplastic resins or as a compatibility agent for thermoplastic resin compositions, and also relates to a resin composition containing this novel olefin polymer. More particularly, the present invention relates to an olefin polymer having a number average molecular weight of 500 to 50,000 and having an acid anhydride group only at a terminal thereof, a resin composition comprising this olefin polymer and a polyamide, and a polyamide-polyolefin resin composition containing the olefin polymer as a compatibility agent.

BACKGROUND ART

It is well-known to obtain a resin composition, which is generally called a polymer alloy, by incorporating into a thermoplastic resin another resin having different characteristics, as a modifier for the thermoplastic resin. However, when resins inherently incompatible with each other are alloyed, problems, such as phase separation, are likely to occur owing to poor dispersion, frequently rendering it difficult to achieve the objective of the modification. Accordingly, attempts have been made to add various compatibility agents in order to achieve the objective.

For example, with respect to alloying a polyamide and a polyolefin which are incompatible with each other, it is known to use, as compatibility agents, a compound obtained by grafting an unsaturated carboxylic acid or a derivative thereof onto a polyolefin in the presence of a radical initiator; a compound obtained by copolymerizing an olefin monomer with a carboxylic acid or a derivative thereof and then neutralizing the resultant copolymer with a metal salt; a compound obtained by copolymerizing a polyamide with a polyolefin; and the like.

However, conventionally known compatibility agents have not been satisfactory.

For example, U.S. Pat. No. 4,174,358 discloses the use of an elastomer having sites (e.g., carboxylic acid or its derivative) which adhere to a polyamide. However, the elastomer must have a specific value of modulus and is not effective when it is used in a small amount. Further, a polyamide resin composition obtained in accordance with U.S. Pat. No. 4,174,358 has disadvantages in that it undergoes gelation and discoloration into a brown color during the processing thereof.

On the other hand, Japanese Patent Application Laid-Open Specification Nos. 60-1255 and 62-265349 disclose the use of a copolymer or a block copolymer of a polyamide and an olefin polymer. These copolymer and block copolymer are not only commercially disadvantageous in that they are difficult to produce, but also unsatisfactory in effect.

DISCLOSURE OF THE INVENTION

It is an object of the present invention to provide a novel olefin polymer which is useful not only as a modifier for a polyamide but also as a compatibility agent capable of exhibiting improved efficiency of dispersion in alloying a polyamide and a polyolefin.

It is another object of the present invention to provide a polyamide resin composition comprising a polyamide and the above-mentioned novel olefin polymer having an acid anhydride group only at a terminal thereof, which is extremely improved in toughness, particularly in tensile elongation.

It is still another object of the present invention to provide a polyamide/olefin-containing polymer resin composition containing the above-mentioned novel olefin polymer having an acid anhydride group only at a terminal thereof, which is improved in efficiency of dispersion by virtue of the olefin polymer contained therein so that it is excellent in toughness (tensile elongation, impact resistance, etc.), long life coolant resistance (LLC resistance), low water absorption properties, weld-line toughness, and the like.

The term "efficiency of dispersion" as used in the present invention means how uniformly and efficiently a resin is microdispersed in another resin in alloying different types of resins. In alloying resins, the uniform microdispersion provides not only an improved surface appearance, which is represented by foliation resistant properties, but also excellent various physical properties and chemical resistance. That is, the uniform microdispersion is an essential requirement for alloying polymers.

According to the present invention, there is provided an olefin polymer having a number average molecular weight of 500 to 50,000 and having an acid anhydride group only at a terminal thereof.

The inventors have found that when such a novel polymer is blended with a polyamide, the resultant composition is extremely improved in toughness, particularly in tensile elongation as compared to the polyamide alone, and that when such a novel polymer is used as a compatibility agent in alloying a polyamide and an olefin-containing polymer, the efficiency of dispersion of the olefin-containing polymer in the polyamide or of the polyamide in the olefin-containing polymer is extremely improved, thereby providing a resin composition having high toughness (tensile elongation, impact resistance, etc.), low water absorption properties, high weld-line toughness, and excellent mold flowability. That is, when the olefin polymer of the present invention, which has a number average molecular weight of from 500 to 50,000 and has an acid anhydride group only at a terminal thereof, is blended with a polyamide, a resin composition which is extremely improved in toughness, particularly in tensile elongation, as compared to the polyamide alone can be obtained. Moreover, when a ternary composition is prepared by blending the olefin polymer of the present invention as component (A), a polyamide as component (B) and an olefin-containing polymer other than the olefin polymer of component (A) as component (C), component (A) acts as a compatibility agent between component (B) and component (C), so that the efficiency of dispersion of component (C) in component (B) or of component (B) in component (C) is improved, thereby obtaining a resin composition having markedly improved toughness (tensile elongation, impact resistance, etc.), LLC resistance and low water absorption properties. These resin compositions according to the present invention are useful as engineering plastics which are materials for structural members in the fields of transport machines (automobiles, ships and the like), apparatus, tools, electronic appliances, electric appliances, sporting goods, leisure goods and the like; and for connectors, tubes and the like.

Accordingly, in another aspect of the present invention, there is provided a polyamide resin composition comprising:

(A) an olefin polymer having a number average molecular weight of 500 to 50,000 and having an acid anhydride group only at a terminal thereof,

(B) a polyamide, and

(C) an olefin-containing polymer other than the olefin polymer as component (A), the proportions of components (A), (B) and (C) being defined as a, b and c % by weight, respectively, which satisfy the relationships represented by the formulae: $0.01 \leq a \leq 50$, $5 \leq b \leq 99.99$, $0 \leq c \leq 94.99$ and $a+b+c=100$.

The novel olefin polymer of the present invention, which has a number average molecular weight of 500 to 50,000 and has an acid anhydride group only at a terminal thereof, will be described hereinbelow.

The novel olefin polymer is a polymer having recurring units represented by the following formula I, II or III in the main chain thereof:

(I)

(II)

(III)

wherein $R_1$ represents an alkyl group having 1 to 12 carbon atoms or wherein each of $Q_1$ through $Q_5$ independently represents a hydrogen atom, an alkyl group having 1 to 6 carbon atoms, or a halogen atom, e.g., a bromine atom or chlorine atom, $R_2$ represents an alkyl group having 1 to 12 carbon atoms, and $R_3$ has the same meaning as $R_1$.

Examples of recurring units (II) include recurring units which are formed by addition polymerization of an α-olefin, such as propylene, 1-butene, 1-pentene, 4-methyl-1-pentene, 1-hexene, 1-octene, 1-decene or 1-dodecene; and recurring units which are formed by addition polymerization of a styrene monomer, such as styrene, 3-methylstyrene or 2,4,5-bromostyrene.

Examples of recurring units (III) include recurring units which are formed by addition polymerization of isobutene, α-methylstyrene or α-methyl-2,4,5-bromostyrene.

In the main chain of the olefin polymer of the present invention, —CH=CH— may be contained in an amount of up to 50% by weight, based on the weight of the main chain. When the amount of —CH=CH— is more than 50% by weight, the heat resistance is disadvantageously lowered, so that discoloration and gelation are likely to occur at high temperatures. The amount of —CH=CH— is preferably 20% by weight or less, more preferably 10% by weight or less, and most preferably 5% or less. Further, in the main chain of the olefin polymer of the present invention, groups such as and may also be contained in an amount of up to about 1% by weight, based on the weight of the main chain. When the amount of these polar groups is more than 1% by weight, the function as a compatibility agent is impaired.

Illustrative examples of polymers for constituting the main chain of component (A) include homopolymers of α-olefins, such as polyethylene, polypropylene, polybutene, polypentene, polyhexene and polyoctenylene; copolymers of α-olefins, such as an ethylene-propylene copolymer, an ethylene-butene copolymer, an ethylene-propylene-1,6-hexadiene copolymer and an ethylene-propylene-5-ethylidene-2-norbornene copolymer; homopolymers of diene monomers, such as polybutadiene; copolymers of diene monomers, such as a butadiene-styrene copolymer; a hydrogenated butadiene-styrene copolymer, a hydrogenated 1,2-polybutadiene, a hydrogenated 1,4-polybutadiene, and a hydrogenated mixture of 1,2-polybutadiene and 1,4-polybutadiene.

An acid anhydride group contained in the novel olefin polymer of the present invention at a terminal thereof is present in the form of a molecular structural unit having at least one acid anhydride group therein. Examples of molecular structural units containing an acid anhydride group therein include

-continued and

Of these, is particularly preferred.

It is important that the novel olefin polymer of the present invention has such an acid anhydride group only at a terminal thereof. When the acid anhydride group is present in a side chain or in the main chain of the olefin polymer, olefin polymer-containing compositions obtained are not sufficiently improved with respect to efficiency of dispersion, so that compositions which are excellent in tensile elongation, impact resistance and weld-line toughness cannot be obtained. The olefin polymer may have an acid anhydride group at one terminal thereof or may have acid anhydride groups at both terminals thereof, as long as the position at which the acid anhydride group is present is a terminal of the olefin polymer, but it is preferred that the olefin polymer has an acid anhydride group at both terminals thereof.

The olefin polymer has a number average molecular weight of 500 to 50,000.

When the number average molecular weight is less than 500, the olefin polymer becomes poor in stability to heat, so that the olefin polymer is likely to volatilize during processing of a composition containing the olefin polymer, thereby causing problems, such as foaming. Further, with respect to the function of the olefin polymer as a compatibility agent, since entwinement between the main chain of component (A) and the olefin-containing polymer as component (C) becomes insufficient, toughness (tensile elongation, impact resistance, etc.) becomes insufficient, although the dispersion efficiency is improved to some extent. The number average molecular weight is preferably 1,000 or more.

On the other hand, when the number average molecular weight exceeds 50,000, the proportion of the terminal acid anhydride groups in the olefin polymer becomes low, so that the function of the olefin polymer as a compatibility agent becomes poor. When the molecular weight of the olefin polymer is high, the melt viscosity or solution viscosity becomes so high that introduction of the acid anhydride group into a terminal or terminals of the olefin polymer becomes difficult. Therefore, the number average molecular weight is preferably 20,000 or less, more preferably 10,000 or less, and most preferably 6,000 or less.

There is no particular restriction with respect to the method for producing the novel olefin polymer. For example, the olefin polymer can be produced by preparing olefin polymer (X) having —OH, —NH$_2$, 13 COOH, —CH—CH$_2$ or

$$CH_2—CH_2$$

as a terminal group thereof, and then reacting the olefin polymer (X) with compound (Y) having not only an acid anhydride group but also a functional group reactive with the above-mentioned terminal group of the olefin polymer (X). Examples of functional groups include —CH=CH$_2$, —NH$_2$, and —OH. In this method, instead of compound (Y), compound (Y') having two mutually neighboring carboxyl groups as well as the above-mentioned functional group may be reacted with olefin polymer (X), and then ring closure is effected between the two carboxyl groups to form an acid anhydride group.

Olefin polymer (X) having the reactive group at a terminal thereof can be obtained by anion (cation) living polymerization or radical polymerization. Examples of methods for anion(cation) living polymerization include a method which comprises polymerizing a diene monomer, e.g., 1,3-butadiene, 1,3-pentadiene or isoprene in the presence of a catalyst, such as sodium naphthalene, and reacting the resultant polymer with ethylene oxide to introduce an —OH group into a terminal of the polymer, followed by hydrogenation; a method which comprises polymerizing a diene monomer in the presence of sodium naphthalene in substantially the same manner as in the above, reacting the resultant polymer with a carbon dioxide gas to introduce a group into a terminal of the polymer, followed by hydrogenation; and a method which comprises effecting cation polymerization of isobutylene using cumyl chloride and boron trichloride to obtain a polymer having a chlorine atom at a terminal thereof, abstracting the terminal chlorine atom by means of a potassium alcoholate of tert-butyl alcohol and tetrahydrofuran, thereby forming —CH=CH$_2$ at a terminal of the polymer.

Examples of methods for radical polymerization include a method which comprises effecting radical polymerization of a diene monomer using hydrogen peroxide as a polymerization initiator to obtain a polymer having —OH at a terminal thereof, followed by hydrogenation; and a method which comprises effecting radical polymerization of a diene monomer using azobisisobutyronitrile and bis-4-aminophenyldisulfide as polymerization initiators, and hydrogenating the resultant polymer to obtain a polymer having an —NH$_2$ group at a terminal thereof Examples of reactions of olefin polymer (X) and compound (Y) having an acid anhydride group include a reaction of —OH or —NH$_2$ as a terminal group of polymer (X) with contained in compound (Y), a reaction of —CH=CH$_2$ as a terminal group of polymer (X) with —CH=CH$_2$ of compound (Y), and a reaction of —COOH of polymer (X) with —OH of compound (Y). Of these reactions, a particularly preferred reaction will be described in detail hereinbelow.

That is, the olefin polymer having an acid anhydride group at a terminal thereof according to the present invention is produced by the reaction of, for example, a compound represented by formula (F1)

with a compound represented by formula (F2):

(F2)

wherein, the number average molecular weight is from 0 to 20,000, and m:n is 90:10.

Next, the method for this reaction will be described in detail.

In the reaction system, an acceptor for hydrochloric acid, which is formed as a by-product, must be present. As acceptors, basic substances, such as amines, pyrimidines and pyridines are used. Particularly, pyridine and triethylamine are preferred. The acceptor is used in an amount corresponding to the amount of hydrochloric acid as a by-product, that is, in an amount equivalent to that of compound (F1).

The reaction is conducted in the presence of the above-mentioned basic substance in an organic solvent.

The organic solvent employed in the present invention is preferably a common solvent for the compound represented by formula (F1) and the compound represented by formula (F2). Examples of solvents include toluene, xylene, ethyl acetate, butyl acetate and tetrahydrofuran. The amount of the solvent is from about 1 to about 2 times that of the compound represented by formula (F2).

The reaction time is generally from 1 to 30 hours, and preferably about 3 to 10 hours. The reaction temperature is preferably in the range of from —20° to 60° C., and especially preferably in the range of from 0° to 30° C. There is no particular restriction with respect to the pressure. However, the reaction is preferably conducted under atmospheric pressure. With respect to the ratio of the feedstocks, the compound represented by formula (F1) is used in an amount of 2 to 5 equivalents per equivalent of the compound represented by formula (F2).

After completion of the reaction, it is preferred to purify the product by a method comprising filtering off hydrochloride formed as a by-product, distilling off the reaction solvent, dissolving the reaction mixture in a halide solvent represented by chloroform, and then sufficiently removing impurities, such as the remaining hydrochloride, unreacted compound represented by formula (F1) and hydrolyzate of this compound, by means of a filter medium represented by silica gel.

This purification method is an advantageous method for removing the above-mentioned impurities sufficiently.

When the purification is not sufficiently effected, extremely disadvantageous results are likely to be caused. For example, the produced copolymer undergoes discoloration and lowering in physical properties.

The compound represented by formula (F2) can be prepared by, for example, anion living polymerization or radical polymerization.

Examples of methods for preparing the compound represented by formula (F2) include a method which comprises dissolving a diene monomer, e.g., 1,3-butadiene, 1,3-pentadiene and isoprene, in an appropriate amount of an ether solvent, such as tetrahydrofuran and dimethyl ether, or in an appropriate amount of a hydrocarbon solvent, such as cyclohexane and n-hexane, and effecting polymerization, using a polymerization catalyst, such as sodium naphthalene, lithium naphthalene, 1,2-dilithio-1,2-diphenylethane, dihydronaphthalene dilithium, metallic sodium and metallic lithium, in an amount of 0.0001 to 1 equivalent per equivalent of the diene monomer, at a reaction temperature of from about —80° C. to about 25° C. for several to several tens of hours, and terminating extension of the terminals of the polymer by the use of, for example, ethylene oxide, propylene oxide or styrene oxide, followed by hydrogenation using a hydrogenation catalyst, such as palladium carbon; and a method which comprises effecting radical polymerization of the above-mentioned type of diene monomer using hydrogen peroxide as a polymerization initiator in an amount of 0.001 to 1 equivalent per equivalent of the diene monomer in a hydrocarbon solvent, such as benzene and toluene, at a temperature of about 0° C. to about 80° C. for several to several tens of hours, and effecting hydrogenation in substantially the same manner as in the above-mentioned method. However, methods for preparing a compound represented by formula (F2) are not limited to these methods.

The "polyamide" used in the present invention means a linear polymer having amide bonds, which is obtained by, for example, condensation polymerization of an organic diamine and an organic dicarboxylic acid, condensation polymerization of an aminocaproic acid, and ring opening polymerization of a lactam. Examples of organic diamines include tetramethylenediamine, hexamethylenediamine, dodecamethylenediamine and methaxylylenediamine. Examples of organic dicarboxylic acids include adipic acid, sebacic acid, dodecanedioic acid, terephthalic acid and isophthalic acid. Examples of aminocaproic acids include 11-aminoundecanoic acid. Examples of lactams include ε-caprolactam and ω-laurolactam. The polyamide may be a copolymer derived from these monomers or a blend of polymers derived from these monomers.

Representative examples of polyamides include nylon 6, nylon 11, nylon 12, nylon 66, nylon 610, nylon 612, nylon 46, nylon 1212, nylon 6T66 (T represents terephthalic acid), nylon 6T6I (I represents isophthalic acid) and nylon 6T66612. The number average molecular weight of the polyamide is from about 500 to about 100,000. In general, a polyamide having a number average molecular weight from 10,000 to 50,000 is frequently employed. The relative viscosity of the polyamide with respect to sulfuric acid is from 1.5 to 8.0, and preferably from 2.0 to 5.0. The number average molecular weight can be calculated from the formula: $2/(a+b)$ when the amounts of terminal $-NH_2$ and terminal $-COOH$ groups of the polyamide are, respectively, a gram equivalent/g and b gram equivalent/g. It is preferred for the polyamide to contain terminal amino groups. The amount of terminal amino groups is generally 10 milligram equivalent/kg or more, preferably 40 milligram equivalent/kg or more, and more preferably 70 milligram equivalent/kg or more. When the mount of terminal amino groups is increased, the impact resistance of the composition containing the polyamide is advantageously improved, however, the mold flowability of the composition is likely to be disadvantageously lowered. Accordingly, the upper limit of amount of the terminal amino groups is preferably about 110 milligram equivalent/kg. When the amount exceeds this upper limit, the molecular weight of the polyamide becomes low, so that the mechanical strength becomes lowered.

Component (C) is an olefin-containing polymer other than the olefin polymer used as component (A). Examples of olefin-containnng polymers include homopolymers of α-olefins; copolymers of two or more types of α-olefins; copolymers comprising α-olefins as main components and comonomers, such as diene monomers, polar vinyl monomers and styrene monomers; unhydrogenated or hydrogenated homopolymers of diene monomers; and unhydrogenated or hydrogenated copolymers of diene monomers and styrene monomers Examples of α-olefin monomers include ethylene, propylene, 1-butene, 1-pentene, 4-methyl-1-pentene, 1-hexene, 1-octene, 1-decene and 1-dodecene. Examples of diene monomers include non-conjugated dienes, such as 1,4-hexadiene, dicyclopentadiene, 2,5-norbornadiene and 5-ethylidene-2-norbornene; and conjugated dienes, such as butadiene, isoprene and piperylene. Examples of polar vinyl monomers include acrylonitrile, acrylic acid and methacrylic acid. Examples of styrene monomers include styrene, α-methylstyrene and vinyltoluene.

Examples of homopolymers of an α-olefin include polyethylene, polypropylene, polybutene, polypentene, polyhexene and polyoctenylene. Examples of copolymers of an α-olefin include ethylene-propylene copolymers, ethylene-butene copolymers, ethylenepropylene-1,6-hexadiene copolymers, ethylenepropylene-5-ethylidene-2-norbornene copolymers, metal-neutralized.ethylene-acrylic acid copolymers and metal-neutralized-,ethylene-methacrylic acid-isobutyl methacrylate copolymers.

Examples of homopolymers of a diene monomer include polybutadiene. Examples of copolymers of a diene monomer include butadiene-styrene copolymers and butadiene-styrene-acrylonitrile copolymers Examples of hydrogenated copolymers of a diene monomer include hydrogenated butadiene-styrene copolymers. Examples of hydrogenated homopolymers of a diene monomer include hydrogenated 1,2-polybutadiene and hydrogenated 1,4-polybutadiene. In addition, hydrogenated mixtures of 1,2-polybutadiene and 1,4-polybutadiene may be used as component (C).

With respect to the hydrogenated polymers and mixtures thereof, the unsaturation degree is preferably 20% by weight or less, more preferably 10% by weight or less, and most preferably 5% by weight or less. When hydrogenation is not effected sufficiently so that the unsaturation degree is high, the polymers and mixtures thereof become thermally unstable, thereby causing discoloration and gelation during processing thereof.

The number average molecular weight of the olefin-containing polymer used as component (C) is from 20,000 to 1,000,000. The upper limit of the number average molecular weight is preferably 500,000, more preferably 200,000, and most preferably 100,000. On the other hand, the lower limit of the number average molecular weight is preferably 30,000, and more preferably 40,000. When the molecular weight is too high, the melt viscosity becomes high and the efficiency of dispersion becomes poor, thereby leading to an unsatisfactory toughness. On the other hand, when the molecular weight is too low, the olefin-containing polymer becomes thermally unstable.

The olefin-containing polymer as component (C) of the present invention may be partly or entirely modified by introducing acid anhydride groups into its main chain or side chains. When the modified olefin-containing polymer is used, the toughness, particularly impact resistance, of the composition is improved. Moreover, the efficiency of dispersion can be improved by virtue of component (A) even when it is used in a small amount. The lower limit of the preferred content of the acid anhydride groups contained in the olefin-containing polymer modified with acid anhydride groups as component (C) is 0.01 by weight, more preferably 0.1% by weight, and most preferably 0.5% by weight. The upper limit is preferably 5% by weight, and more preferably 2% by weight. When the content of the acid anhydride groups is too high, the mold flowability of the composition is lowered, so that it becomes difficult for the composition to be injection-molded, and the composition is also likely to undergo discoloration and gelation On the other, when the content is too low, the effect for improving toughness becomes small.

The weight ratio of the olefin-containing polymer having acid anhydride groups to the olefin-containing polymer having no acid anhydride groups is not particularly limited. However, the weight ratio is preferably from 50/50 to 3/97, more preferably from 20/80 to 5/95, and most preferably from 15/85 to 10/90. When the amount of the olefin-containing polymer having acid anhydride groups is too large, the melt flowability becomes low, so that it becomes difficult for the composition to be injection-molded, and problems, such as discoloration and gelation, are caused.

Examples of methods for producing the modified olefin-containing polymer having acid anhydride groups in the main chain or side chains, which may be used as the olefin-containing polymer as component (C), include a method which comprises addition-bonding an unsaturated acid anhydride, for example, maleic anhydride, itaconic anhydride and citraconic anhydride to the above-mentioned type of unmodified olefin-containing polymer; a method which comprises introducing the above-mentioned type of unsaturated acid anhydride by copolymerization at the time of the preparation of the olefin-containing polymer; and a method which comprises introducing an unsaturated dicarboxylic acid, for example, maleic acid, itaconic acid and citraconic acid by copolymerization monomer at the time of the preparation of the olefin-containing polymer and then effecting dehydration to form acid anhydride groups. Of these methods, the method which comprises addition-bonding an unsaturated acid anhydride to the olefin-containing polymer is preferred. Examples of methods for conducting the addition-bonding include a method which comprises melt-kneading the above-mentioned type of unsaturated carboxylic anhydride together with the olefin-containing polymer. In this method, the presence of a radical generating agent facilitates the addition reaction With respect to the unsaturated carboxylic acid, maleic anhydride is preferred. There may also be used a method which comprises dissolving an olefin-containing polymer, unsaturated carboxylic acid and radical generating agent in a solvent to effect addition reaction The resin compositions according to the present invention which are improved in dispersion include a composition comprising components (A) and (B), and a composition comprising components (A), (B) and (C). The composition comprising components (A) and (B) is extremely improved in toughness, particularly in tensile elongation, as compared to that of the polyamide alone. The composition comprising component (B) as the main component, and components (A) and (C) blended therewith is improved in impact resistance, LLC resistance and low water absorption properties. On the other hand, the composition comprising component (C) as the main component, and components (A) and (B) blended therewith is excellent in heat resistance and gas barrier properties as compared to those of the olefin-containing polymer alone.

In the composition of the present invention, the proportions of components (A), (B) and (C) which are defined as a, b and c % by weight, respectively, satisfy the relationships represented by the formulae: $0.01 \leq a \leq 50$, $5 \leq b \leq 99.99$, $0 \leq c \leq 94.99$ and $a+b+c=100$.

As described above, the amount of component (C) may be reduced to 0, i.e., the composition may comprise only components (A) and (B), when an improvement of the toughness of a polyamide, particularly the tensile elongation thereof, is intended and when an increase in melt viscosity of a polyamide is intended for improving tube-extrusion properties or improving processability in blow molding. In this case, the lower limit of the amount of component (A) is 0.01% by weight, preferably 0.1% by weight, more preferably 1% by weight. The upper limit of the amount of component (A) is 50% by weight, preferably 20% by weight, more preferably 10% by weight. When the amount of component (A) is less than 0.01% by weight, not only is thettensile elongation not sufficiently improved, but also the melt viscosity is not increased. On the other hand, when the amount of component (A) exceeds 50% by weight, not only are the stiffness, chemical resistance and heat resistance inherent in a polyamide impaired, but also the melt viscosity becomes too high.

Further, according to the present invention, there is provided a ternary composition comprising components (A), (B) and (C), which is excellent in impact resistance, LLC resistance and low water absorption properties When the composition is of the ternary type, the lower limit of the amount of component (A) is 0.01% by weight, preferably 0.5% by weight and more preferably 3% by weight. The upper limit of the amount of component (A) is preferably 20% by weight and more preferably 5% by weight. In the case of the ternary composition, component (A) acts as a compatibility agent between component (B) and component (C), so that the efficiency of dispersion of component (C) in component (B), or of component (B) in component (C), is improved When the amount of component (A) is less than 0.01% by weight, the effect of component (A) as a compatibility agent is not sufficient, so that the composition is likely to undergo foliation in processing. The amount of component (A) used as a compatibility agent is not necessarily large, and is preferably not greater than 20% by weight. Even if component (A) is used in an amount greater than needed, the effect is not increased proportionally to the increase in the amount, leading to an economic disadvantage.

When it is intended to improve the tensile elongation and the impact resistance of a polyamide, the lower limit of the amount of component (C) is preferably 5% by weight, more preferably 15% by weight, and the upper limit of the amount of component (C) is 50% by weight, preferably 30% by weight. When the amount of component (C) is too large, the heat resistance and mechanical strength of the polyamide are likely to be lowered. On the other hand, when the amount of component (C) is too small, the desired effect is not attained sufficiently. In this case, it is preferred that at least a portion of component (C) be modified with an acid anhydride group.

With respect to the amount of component (B), the lower limit is preferably 50% by weight, more preferably 70% by weight, and the upper limit is preferably 95% by weight, more preferably 85% by weight. When the amount of component (B) is too small, the mechanical properties and heat resistance inherent in a polyamide are likely to be lowered. On the other hand, when the amount of component (B) is too large, the tensile strength and impact resistance are not improved sufficiently.

When it is intended to improve the low water absorption properties and LLC resistance of a polyamide, the amount of component (C) is preferably 20 to 60% by weight. When the amount of component (C) is less than 20% by weight, improvement in LLC resistance is unsatisfactory, whereas when the amount exceeds 60% by weight, the heat resistance and stiffness inherent in a polyamide are likely to be lowered. With respect to component (B), when the amount is less than 40% by weight, the heat resistance and stiffness inherent in a polyamide are likely to be lowered, whereas when the amount is more than 80% by weight, the LLC resistance improving effect becomes small.

When it is intended to improve the heat resistance and the barrier properties for fluids (e.g., gases and liquids, such as oxygen and gasoline) of the olefin-containing polymer, the amount of component (B) is preferably from 5 to 40% by weight. When the amount is less than 5% by weight, the improvement in heat resistance and barrier properties for gases and liquids is unsatisfactory, whereas when the amount is more than 40% by weight, disadvantageously high water absorption properties are caused. With respect to component (C), the amount is preferably from 60 to 94.99% by weight. When the amount is less than 60% by weight, properties inherent in the olefin-containing polymer are disadvantageously sacrificed, whereas when the amount is more than 94.99% by weight, the improvement in heat resistance and barrier properties for gases and liquids disadvantageously becomes small.

In the present invention, blending of components (A), (B) and (C) is preferably carried out by melt-kneading. Examples of machines for melt-kneading include a ZSK twin-screw extruder manufactured and sold by Werner & Pfleiderer Co., Ltd., a twin-screw extruder manufactured and sold by Ikegai Tekko Co., Ltd., and a cokneader and a multi-screw kneading machine manufactured and sold by Buss Co., Ltd. All of the components may be fed from a hopper of the extruder, or some of the components may be side fed.

In order to further lower the water absorption, and in order to improve the dimensional stability and stiffness and improve the stiffness at high temperatures, the composition according to the present invention may be blended with other thermoplastic resins, such as polyphenylene ether, polyphenylene sulfide, polysulfone, polyarylate and polycarbonate. The amount of the thermoplastic resin is up to 100 parts by weight per 100 parts by weight of the composition of the present invention.

Further, well-known additives for polyamide or polyolefin may be added in an amount which is ordinarily employed in the art. Examples of additives include heat stabilizers, such as copper compounds, alkali metal compounds, hindered phenol compounds and hindered amine compounds; lubricants and release agents, such as metal stearates, metal montanates, montanic esters, bisamide compounds and silicon compounds; fibrous or non-fibrous inorganic fillers, such as glass fibers, talc, wollastonite, kaolin, mica and potassium titanate; organic reinforcing agents, such as carbon fibers and aramide fibers; fire retardants; pigments; dyes; ultraviolet light absorbers and crystal nucleating agents.

As described above, according to the present invention, the toughness of a polyamide is markedly improved by blending the polyamide [component (B)] with component (A). That is, the tensile elongation and the hinge effect properties are greatly improved. Moreover, since the melt viscosity becomes high, it is possible to perform tube-extrusion and blow molding. Further, by blending component (C), not only is the impact resistance markedly improved, but also the water adsorption becomes lowered. Moreover, the LLC resistance is also improved. Of course, this composition is also a suitable material for tube extrusion. Further, a composition obtained by blending an olefin-containing polymer [component (C)] as the main component with a polyamide [component (B)] and component (A), exhibits markedly improved heat resistance and barrier properties for gases and liquid.

BEST MODE FOR CARRYING OUT THE INVENTION

The present invention will be described with reference to the Examples, which should not be construed as limiting the scope of the present invention.

First, component materials and test methods employed are described below.

(1) Component materials

① Ny66

Nylon 66: the number average molecular weight is about 17000, and the content of terminal $NH_2$ groups is 46 milligram equivalent/kg.

② NY6T66

Copolymer of nylon 6T and nylon 66: the weight ratio of nylon 6T to nylon 66 is 36:64. Relative viscosity with respect to sulfuric acid (JIS K6810, 98% $H_2SO_4$) is 2.65.

③ Ny6T66612

Copolymer of nylon 6T, nylon 66 and nylon 612: the weight ratios of nylon 6T, nylon 66 and nylon 612 are 40:55:5. Relative viscosity with respect to sulfuric acid (JIS K6810, 98% $H_2SO_4$) is 2.67.

④ THPB-1

Hydrogenated polybutadiene having its terminals modified with trimellitic anhydride, which is obtained in Example 1.

⑤ THPB-2

Hydrogenated polybutadiene having its terminals modified with trimellitic anhydride, which is obtained in Example 2.

⑥ HTR-1

Hydrogenated styrene-butadiene block copolymer.
Molecular weight: 50,000
Styrene content: 32% by weight
Tensile modulus: 370 kg/cm$^2$

⑦ HTR-2

Hydrogenated styrene-butadiene block copolymer.
Molecular weight: 50,000
Styrene content: 18% by weight
Tensile modulus: 38 kg/cm$^2$

⑧ MHTR-1

Compound obtained by addition-bonding maleic anhydride to HTR-1 in an amount of 1.8% by weight.
Tensile modulus 370 kg/cm$^2$

⑨ MHTR-2

Compound obtained by addition-bonding maleic anhydride to HTR-2 in an amount of 1.4% by weight.
Tensile modulus: 40 kg/cm$^2$

⑩ MHTR-3

Hydrogenated styrene-butadiene block copolymer to which maleic anhydride is addition-bonded in an amount of 1.8% by weight.
Molecular weight: 50,000.
Styrene content: 42% by weight
Tensile modulus: 2,300 kg/cm$^2$

⑪ EPDM

Ethylene-propylene-ethylidenenorbornene terpolymer: Mitsui Elastomer K9720 manufactured by Mitsui Petrochemical Industries, Ltd., Japan.

⑫ EP

Ethylene-propylene copolymer: Toughmer P0180 manufactured by Mitsui Petrochemical Industries, Ltd., Japan.

⑬ MEP

Compound obtained by addition-bonding maleic anhydride to EP in an amount of 1.8% by weight.

⑭ MEPDM

Compound obtained by addition-bonding maleic anhydride to the above-mentioned type of EPDM in an amount of 1.8% by weight.

In the above, materials ① to ③ correspond to component (B), materials ④ and ⑤ correspond to component (A), and materials ⑥ to ①④ correspond to component (C).

(2) Test methods

① Izod impact test

Test on Izod Impact Strength (notched) was conducted in accordance with ASTM D256.

② Flexural test

Test was conducted in accordance with ASTM D790.

③ Tensile test

Test was conducted in accordance with ASTM D638.

④ Size of dispersed particles

A flexural test piece was cooled with liquid nitrogen, and broken, and the exposed, broken section was etched with hot xylene and then examined by means of a scanning electron microscope.

⑤ Foliation

A dumbbell test piece having a thickness of 1 mm was prepared by injection-molding, and then examined with respect to the surface appearance.

⑥ Compatibility

The exposed, broken section of the test piece which had been subjected to the tensile test, was examined to evaluate the degree of foliation.

⑦ Flowability

Figure 1:
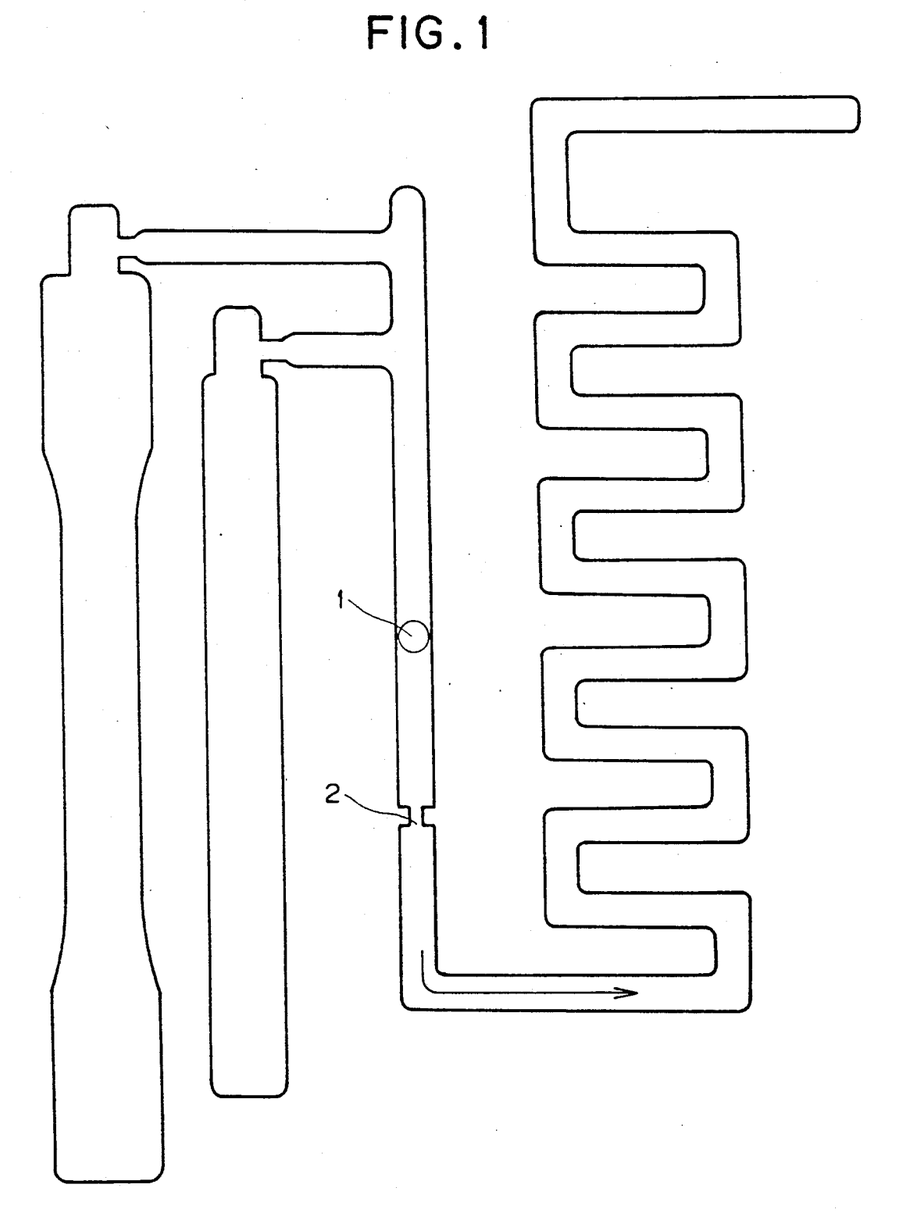
FIG. 1 shows a schematic diagram of a metal mold used for evaluation of the melt flowability of the resin compositions in Examples 14 to 15, and 50 to 53 and Comparative Examples 3 and 15 to 17.

The melt flowability was measured by conducing molding by means of a metal mold shown in FIG. 1, wherein the cylinder temperature was 290° C., the metal mold temperature was 80° C., and the injection pressure was 536 kg/cm². Referring to FIG. 1, a molten resin flows from sprue opening 1 into a meander-type metal mold (width: 6.0 mm, thickness: 1.5 mm) shown on the right side of FIG. 1, and then flows through gate 2 in the direction indicated by arrow. The resin flows, with the heat thereof being gradually absorbed by the metal mold, until it reaches a certain position where it solidifies so that it no longer flows. Then, the length of the resin as from gate 2 to the forward end of the resin which has flowed in the direction indicated by the arrow is measured. The length was taken as a criterion of the flowability.

⑧ Weld-line toughness

A weld-line test piece was prepared using a metal mold which is designed to form a weld-line by counter-flow collision of a molten resin, and the tensile strength of the test piece was measured.

EXAMPLE 1

(Production of an olefin polymer having an acid anhydride group at both terminals thereof)

300 g of a hydrogenated polybutadiene having hydroxyl groups at both its terminals [NISSO-PB, GI-3000, manufactured by Nippon Soda Co., Ltd., Japan] and 15.8 g of pyridine were dissolved in 400 ml of ethyl acetate. The resultant solution was cooled with ice, and to the solution, a solution prepared by dissolving 42.1 g of anhydrous trimellitic chloride into 200 ml of ethyl acetate was dropwise added over a period of 1 hour in an atmosphere of dry nitrogen. After completion of the dropwise addition, the resultant mixture was heated to room temperature, and then stirred for 8 hours. Insoluble precipitates formed were removed by filtration. The obtained filtrate was condensed by a rotary evaporator. The resultant residue was dissolved in 500 ml of chloroform, and insoluble substances were removed by filtration. The obtained filtrate was purified by means of a silica gel column. The solvent contained in the filtrate was distilled off using a rotary evaporator, to thereby obtain a viscous liquid polymer which assumes a slightly yellowish color. This compound is represented by the following formula:

(The compound was found to have a number average molecular weight of 4,860 as measured by quantitative analysis with respect to the terminal groups. This means that in the above formula, l was about 8. With respect to m and n, it was confirmed by $^1$H-NMR analysis that the m/n ratio was about 9/1.) The yield of the compound was 295 g.

It was confirmed by thin-layer chromatography that the obtained polymer had no impurities, such as free trimellitic anhydride, anhydrous trimellitic chloride and pyridine.

Figure 2:
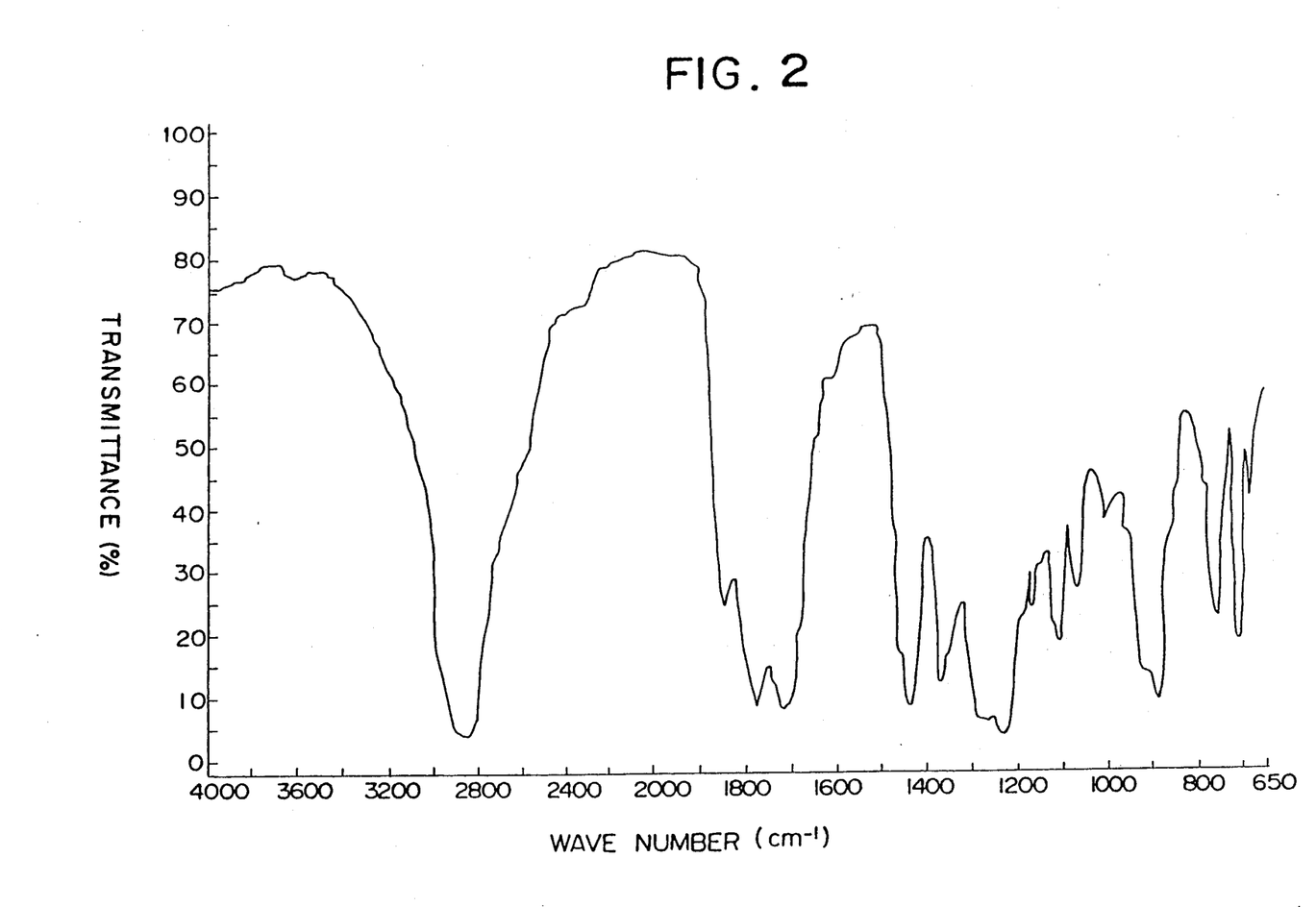
FIGS. 2 and 3, respectively, show IR spectra of the olefin polymer having an acid anhydride group only at a terminal thereof of the present invention obtained in Example 1 and the hydrogenated polybutadiene used as the raw material for producing the olefin polymer.
Figure 3:
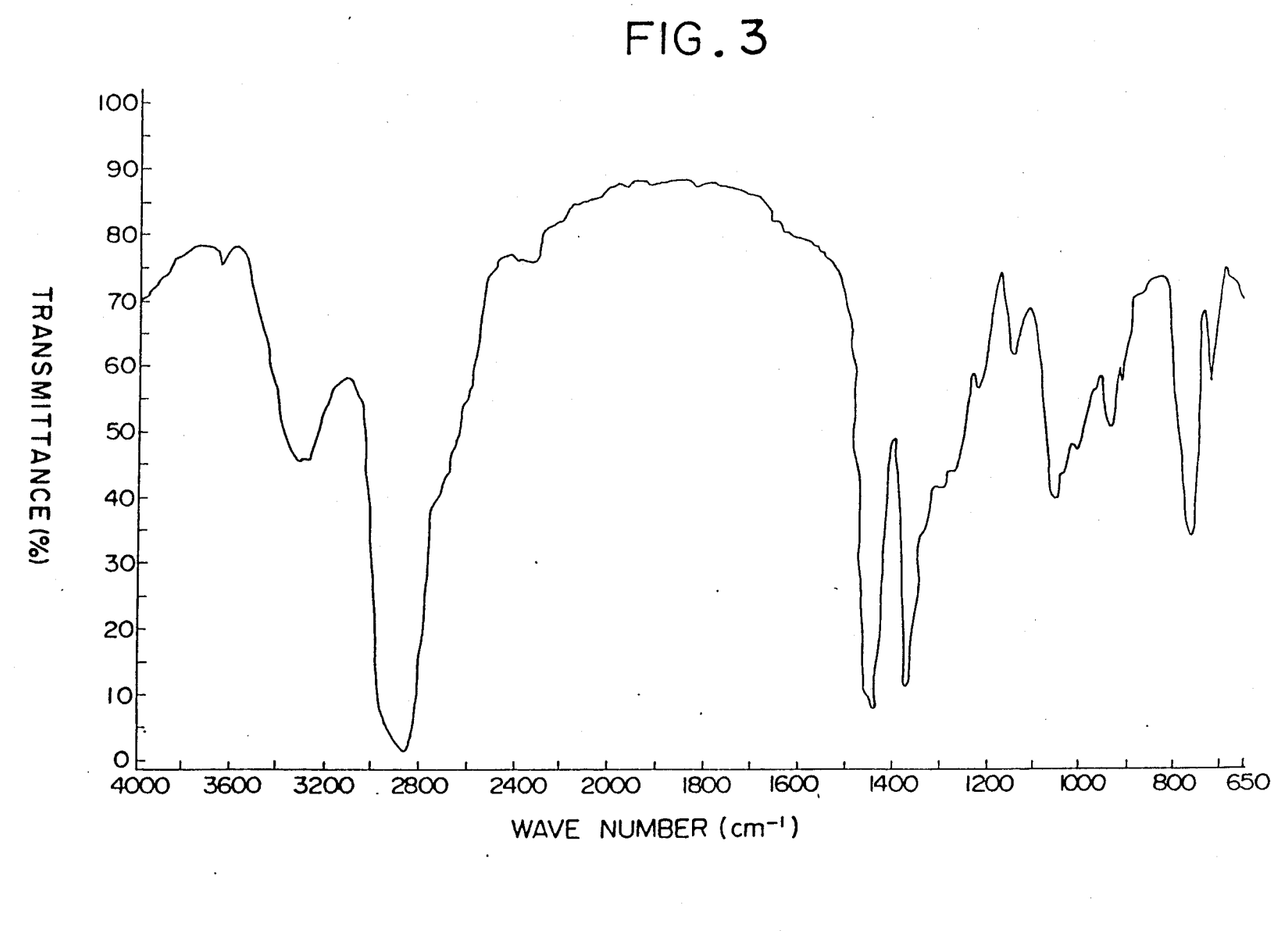

In FIG. 2 showing an IR spectrum of the obtained polymer, stretching vibrations ascribed to C=O of an acid anhydride group are observed around 1850 cm$^{-1}$ and around 1780 cm$^{-1}$, a stretching vibration ascribed to C=O of an ester bond is observed around 1720 cm$^{-1}$, a stretching vibration ascribed to C—O of an ester bond is observed around 1300 cm$^{-1}$ to 1220 cm$^{-1}$. As a result, the presence of the acid anhydride groups and the ester bonds was confirmed. These results show that the obtained polymer is an olefin polymer of the present invention having an acid anhydride group at a terminal thereof. It is also confirmed that in the above-mentioned IR spectrum, no absorption ascribed to a hydroxyl group is observed, differing from the IR spectrum (FIG. 3) of hydrogenated polybutadiene having hydroxyl groups at both terminals thereof which was ued as a raw material of the above-obtained polymer, which spectrum is given for comparison.

EXAMPLE 2

Substantially the same procedure as in Example 1 was repeated except that NISSO-PB GI-1000 (manufactured by Nippon Soda Co., Ltd., Japan) was employed as a hydrogenated polybutadiene having hydroxyl groups at both terminals thereof, to thereby obtain a hydrogenated polybutadiene having trimellitic anhydride groups at both terminals thereof. The number average molecular weight as measured by quantitative analysis with respect to the terminal groups was 1,520, and the yield was 290 g.

EXAMPLE 3

300 g of a hydrogenated polybutadiene having hydroxyl groups at both terminals thereof [NISSO-PB, GI-3000 manufactured by Nippon Soda Co., Ltd., Japan] and 15.8 g of pyridine were dissolved in 400 ml of ethyl acetate. Then, the resultant solution was cooled with ice, and to the solution, a solution prepared by dissolving 21.1 g of anhydrous trimellitic chloride and 10.2 g of terephthalic chloride in 200 ml of ethyl acetate was dropwise added over a period of 1 hour in an atmosphere of dry nitrogen. Thereafter, substantially the same procedure as in Example 1 was repeated.

The obtained product was a viscous liquid polymer assuming a slightly yellowish color. The yield of the polymer was 292 g. The number average molecular weight of the polymer was about 9,000. The presence of acid anhydride groups and ester bonds was confirmed by IR spectrum analysis.

EXAMPLE 4

300 g of hydrogenated polybutadiene having hydroxyl groups at both terminals thereof [NISSO-PB, GI-3000, Nippon Soda Co., Ltd., Japan], 15.8 g of pyridine, 3.6 g of anhydrous trimellitic chloride and 16.9 g of terephthalic chloride were reacted in substantially the same manner as in Example 3.

The obtained product was a viscous liquid polymer assuming a slightly yellowish color, and the yield of the polymer was 296 g. The number average molecular weight of the polymer was about 20,000. The presence of acid anhydride groups and ester bonds was confirmed by IR spectrum analysis.

REFERENCE EXAMPLE 1

56.0 g of a hydrogenated polybutadiene having no functional groups at terminals thereof [NISSO-PB, BI-3000, Nippon Soda Co., Ltd., Japan] and 6.0 g of maleic anhydride were mixed and heated at 120° C. under a stream of dry nitrogen. After the maleic anhydride in the mixture was completely dissolved, 2.4 g of benzoyl peroxide dissolved in a small amount of acetone was gradually added to the mixture, and heated at 120° C. for 5 hours to advance the reaction.

After completion of the reaction, the reaction mixture was dissolved in n-hexane, and unreacted maleic anhydride remaining in the mixture was removed by using a silica gel column. Thereafter, the solvent contained in the mixture was distilled off using a rotary evaporator, to thereby obtain a liquid polymer assuming a slightly yellowish color.

It is considered that the polymer is represented by the following formula:

(wherein, $(l+m): n$ is 9:1),
and that the acid anhydride groups are addition-bonded not to the terminals but to the main chain of the polymer. The yield of the polymer was 54 g, and the number average molecular weight of the polymer was 4,600. Absorption ascribed to the acid anhydride groups was observed in the IR spectrum of the polymer.

The titration of the polymer with sodium methoxide showed that the addition ratio of maleic anhydride was found to be 6.0% by weight.

EXAMPLES 5 TO 15 AND COMPARATIVE EXAMPLES 1 TO 3

Ny66, Ny6T66, Ny6T66612 and THPB-1 were melt-kneaded by a twin-screw extruder PCM30 (manufactured by Ikegai Tekko Co., Ltd.), and pelletized, and then subjected to molding by an injection molding machine. The resultant shaped articles were evaluated with respect to properties. The results are shown in Table 1. From the results, it is apparent that when THPB is added to polyamide, the tensile elongation of the shaped article is improved, and that decrease in the mold flowability due to the incorporation of THPB is small.

EXAMPLES 16 TO 28 AND COMPARATIVE EXAMPLES 4 TO 5

Ny66, THPB-1 and HTR-2 were melt-kneaded in substantially the same manner as in Example 5. The properties of the thus-obtained compositions were evaluated. The results are shown in Table 2. As apparent from the results, high Izod impact strength is attained.

On the other hand, the compositions comprising only Ny66 and THPB-1, are also improved in Izod impact strength. However, the degree of the improvement is small.

EXAMPLES 29 TO 34 AND COMPARATIVE EXAMPLE 6

Substantially the same procedure as in Example 5 was repeated except that the proportions of the components of the quadruple composition comprising Ny66, THPB-1, HTR-2 and MHTR-2, were changed, thereby obtaining pellets. The Izod impact strengths of the pellets were evaluated. The results are shown in Table 3. Effect of the incorporation of THPB-1 on Izod impact strength is clearly observed

EXAMPLES 35 TO 43 AND COMPARATIVE EXAMPLES 7 TO 11

Substantially the same procedure as in Example 5 was repeated except that Ny66, EPDM, MEPDM, HTR-1, MHTR-1, THPB-1 and THPB-2 were employed, thereby obtaining compositions. The properties of the thus-obtained compositions were evaluated. The results are shown in Table 4. Effect of the incorporation of THPB on Izod impact strength is clearly observed.

EXAMPLES 44 TO 48

Substantially the same procedure as in Example 5 was repeated except that Ny66, HTR-1, MHTR-2, MHTR-3, EP, MEP and THPB-1 were employed, thereby obtaining compositions. The properties of the thus-obtained compositions were evaluated. The results are shown in Table 5. As apparent from the results, each of the compositions according to the present invention has high impact strength.

EXAMPLE 49 AND COMPARATIVE EXAMPLES 12 TO 14

To mixtures of Ny66, HTR-1 and MHTR-1 were individually added THPB-1, hydrogenated polybutadiene having hydroxyl groups at terminals thereof (the starting material for producing THPB-1) and an adduct obtained in Reference Example 1 by addition-bonding of maleic anhydride to hydrogenated polybutadiene at its main chain, thereby obtaining compositions. The thus-obtained compositions and the mixture of Ny66, HTR-1 and MHTR-1 were evaluated. The results are shown in Table 6. As apparent from the results, only the composition containing THPB-1 which has acid anhydride groups at terminals thereof is excellent in Izod impact strength.

In the above-mentioned Examples 5 to 49 and Comparative Examples 1 to 14, the conditions for the melt-kneading by a twin-screw extruder were varied according to the type of nylon, as follows.

|  | Ny66 | Ny6T66 | Ny6T66612 |
|---|---|---|---|
| Cylinder temperature (°C.): | 270 | 290 | 290 |
| Screw revolution number (r.p.m.): | 170 | 170 | 170 |

EXAMPLE 50

To 100 parts by weight of a polymer blend obtained by blending Ny66 with polypropylene (ASAHIKASEI POLYPRO M-1600 manufactured by Asahi Kasei Kogyo K.K., Japan) in a weight ratio of 7:3 were added 2 parts by weight of MHTR-1 and 1 part by weight of THPB-1. The resultant blend was kneaded and extruded by a twin-screw kneader A1., Japan), to thereby obtain a composition.

EXAMPLE 51

Substantially the same procedure as in Example 50 was repeated except that 4 parts by weight of MHTR-1 and 2 parts by weight of THPB-1 were blended with the polymer blend, to thereby obtain a composition.

COMPARATIVE EXAMPLE 15

Substantially the same procedure as in Example 50 was repeated except that 3 parts of MHTR-1 were blended with the polymer blend, to thereby obtain a composition.

COMPARATIVE EXAMPLE 16

Substantially the same procedure as in Example 50 was repeated except that 12 parts by weight of MHTR-1 were blended with the polymer blend, to thereby obtain a composition.

COMPARATIVE EXAMPLE 17

Only Ny66 and polypropylene M-1600 were melt-extruded to prepare a composition.

Each of the resin compositions obtained in Examples 50 and 51 and Comparative Examples 15 to 17 was individually molded by an injection molding machine (IS 50EP manufactured and sold by Toshiba Co., Ltd.) at a resin temperature of 286° C. and at a mold temperature of 80° C. under an injection molding pressure of 480 kg/cm$^2$, thereby obtaining test pieces. The properties of the test pieces were examined. The results are summarized in Table 7.

EXAMPLE 52

To 100 parts by weight of the composition obtained in Example 51 were added 50 parts by weight of a glass fiber (FT-II manufactured and sold by Asahi Fiber Glass Co., Ltd.). The resultant mixture was kneaded and extruded by a twin screw kneader (PCM45, Ikegai Tekko Co., Ltd., Japan), to thereby obtain a composition.

EXAMPLE 53

Substantially the same procedure as in Example 52 was repeated except that 80 parts by weight of Ny66, 20 parts by weight of polypropylene, 5 parts by weight of MHTR-1, 2 parts by weight of THPB-1 and 53 parts by weight of a glass fiber were blended, to thereby obtain a composition.

Each of the resin compositions obtained in Examples 52 and 53 was molded by the injection molding machine (IS 50EP manufactured and sold by Toshiba Co., Ltd.) at a resin temperature of 290° C. and at a mold temperature of 80° C. under an injection molding pressure of 720 kg/cm$^2$, to thereby obtain test pieces. The properties of the test pieces were examined. The results are summarized in Table 7.

REFERENCE EXAMPLE 2

11.25 g of a hydrogenated polybutadiene having hydroxyl groups at both terminals thereof [NISSO-PS GI-3000, manufactured and sold by Nippon Soda Co., Ltd., Japan] was dissolved in 400 ml of dry $CHCl_3$. To the resultant solution was added 30 g of $Cu(MnO_4)_2 \cdot 8 H_2O$, and the resultant mixture was stirred at room temperature for 24 hours. After completion of the reaction, 100 ml of diethyl ether was added to the reaction mixture and stirred for 5 minutes, follwed by filtration using Celite to remove inorganic materials. The filtrate was passed through a silica gel column, and the resultant fraction was condensed by a rotary evaporator, thereby obtaining 108 g of a slightly yellowish viscous polymer.

In an IR spectrum of the product, no absorption ascribed to hydroxyl groups was observed around 3,300 cm$^{-1}$, but a strong absorption ascribed to the carbonyl groups of carboxylic acid was observed around 1,760 cm$^{-1}$. This shows that the product was a hydrogenated polybutadiene having carboxyl groups at both terminals thereof.

REFERENCE EXAMPLE 3

120 g of an aqueous solution containing 50% AH salt (adipic acid/hexamethylenediamine) was put into a 400 cc autoclave, and the atmosphere in the autoclave was replaced 3 times with $N_2$. Thereafter, the solution was stirred at 230° C. for 1 hour to remove water therefrom. Then, to the resultant reaction system was added 50 g of the hydrogenated polybutadiene having carboxyl groups at both terminals thereof obtained in Reference Example 2, and the reaction temperature was gradually elevated from 230° C. to 300° C. while stirring. The reaction was continued at 300° C. for 3 hours, to thereby obtain 102.8 g of a reaction product.

COMPARATIVE EXAMPLE 18

Substantially the same procedure as in Example 5 was repeated except that 74.8 parts by weight of Ny66, 5.8 parts by weight of the reaction product obtained in Reference Example 3, and 19.4 parts by weight of HTR-2 were employed, to thereby obtain pellets of a composition. The pellet had an Izod impact strength of 9 kg.cm/cm. This Izod impact strength of the pellets is extremely low as compared to that obtained in Example 25. This demonstrates the effect of the incorporation of THPB-1.

weight of HTR-2 and 3.7% by weight of MHTR-1, to thereby obtain two types of pellets. The Izod impact strengths of the two types of pellets were 21 kg.cm/cm and 22 kg.cm/cm, respectively, which were extremely low as compared to that obtained in Example 49. This demonstrates the effect of the incorporation of THPB-1 in the present invention.

TABLE 1

| | Formulation | | | | dry | | wet | | |
|---|---|---|---|---|---|---|---|---|---|
| Example No. | Ny66 | N6T66 | Ny6T66612 | THPB-1 | Tensile strength kg/cm$^2$ | Tensile elongation % | Tensile strength kg/cm$^2$ | Tensile elongation % | Mold flowability cm |
| | | | % by weight | | | | | | |
| Comparative Example 1 | 100 | | | | 870 | 26 | — | — | — |
| Example 5 | 99.99 | | | 0.01 | 860 | 29 | — | — | — |
| Example 6 | 99.9 | | | 0.1 | 830 | 33 | — | — | — |
| Example 7 | 99 | | | 1 | 820 | 42 | — | — | — |
| Example 8 | 97 | | | 3 | 810 | 59 | — | — | — |
| Example 9 | 93 | | | 7 | 760 | 68 | — | — | — |
| Example 10 | 90 | | | 10 | 730 | 69 | — | — | — |
| Example 11 | 50 | | | 50 | 370 | 69 | — | — | — |
| Comparative Example 2 | | 100 | | | 910 | 10 | 570 | 13 | — |
| Example 12 | | 99.5 | | 0.5 | 900 | 15 | 560 | 18 | — |
| Example 13 | | 99 | | 1 | 890 | 18 | 550 | 39 | — |
| Comparative Example 3 | | | 100 | | 920 | 12 | 580 | 15 | 8.9 |
| Example 14 | | | 99.5 | 0.5 | 910 | 17 | 570 | 18 | 8.7 |
| Example 15 | | | 99 | 1 | 900 | 18 | 570 | 40 | 8.6 | dry: Allowed to stand in a desiccator at 23° C. for 24 hours after being molded.
wet: Allowed to stand at 23° C. and 50% RH for 48 hours after being immersed in hot water at 80° C. for 6 hours.

COMPARATIVE EXAMPLES 19 AND 20

Substantially the same procedure as in Example 5 was repeated except that 2.9% by weight of each of a hydrogenated polybutadiene having a number average molecular weight of 1300 and having a carboxyl group at both terminals thereof [NISSO-PB GI-1000, manufactured and sold by Nippon Soda Co., Ltd., Japan] and the hydrogenated polybutadiene produced in Reference Example 2 having a number average molecular weight of 4500 and having carboxyl groups at both terminals thereof were individually blended with 77.7% by weight of Ny66 and 19.4% by weight of HTR-2, to thereby obtain two types of pellets. The Izod impact strengths of the two types of pellets were 4.3 kg.cm/cm and 4.6 kg.cm/cm, respectively, which were extremely low as compared to that obtained in Example 25. This demonstrates the effect of the incorporation of THPB-1.

COMPARATIVE EXAMPLES 21 AND 22

Substantially the same procedure as in Example 5 was repeated except that 1% by weight of each of the hydrogenated polybutadienes having carboxyl groups at both terminals thereof employed in Comparative Examples 19 and 20, which have number average molecular weights of 1300 and 4500, respectively, was individually blended with 77.7% by weight of Ny66, 18.3% by

TABLE 2

| Example No. | Formulation | | | Kneading method | Izod impact strength kg · cm/cm |
|---|---|---|---|---|---|
| | Ny66 | THPB-1 | HTR-2 | | |
| | % by weight | | | | |
| Example 16 | 94.05 | 0.95 | 5 | A | 8.9 |
| Example 17 | 89.1 | 0.9 | 10 | " | 13.9 |
| Example 18 | 79.2 | 0.8 | 20 | " | 16.5 |
| Example 19 | 92.2 | 2.8 | 5 | " | 13.7 |
| Example 20 | 87.4 | 2.6 | 10 | " | 17.4 |
| Example 21 | 77.7 | 2.3 | 20 | " | 91.6 |
| Example 22 | 88.8 | 6.2 | 5 | " | 14.0 |
| Example 23 | 84.1 | 5.9 | 10 | " | 17.4 |
| Example 24 | 74.8 | 5.2 | 20 | " | 89.5 |
| Example 25 | 77.7 | 2.9 | 19.4 | B | 75.9 |
| Comparative Example 4 | 80 | — | 20 | C | 4.9 |
| Comparative Example 5 | 100 | — | — | | 5.1 |
| Example 26 | 99 | 1 | — | C | 5.3 |
| Example 27 | 98.1 | 2.9 | — | C | 5.6 |
| Example 28 | 93.5 | 6.5 | — | C | 8.8 |

A: Ny66 and THPB-1 were melt kneaded and pelletized. Then, the obtained pellets were melt-kneaded with HTR-2.
B: Ny66, THPB-1 and HTR-2 were melt kneaded at one time.
C: Ny66 and THPB-1, or Ny66 and HTR-2 were melt-kneaded.

In each of the above examples, 0.3 part by weight of 4,4-butylidene-bis(3-methyl-6-tert-butylphenol) was blended as an antioxidant.

TABLE 3

| Example No. | Formulation | | | | Izod impact strength | | | | |
|---|---|---|---|---|---|---|---|---|---|
| | Ny66 | THPB-1 | HTR-2 | MHTR-2 | 23° C. | 0° C. | −10° C. | −20° C. | −40° C. |
| | % by weight | | | | kg · cm/cm | | | | |
| Comparative Example 6 | 78 | 0 | 18.3 | 3.7 | 21 | — | — | — | — |
| Example 29 | 77.9 | 0.1 | " | " | 24 | — | — | — | — |
| Example 30 | 77.7 | 0.3 | " | " | 81 | 18 | — | — | — |
| Example 31 | 77.5 | 0.5 | " | " | 116 | 37 | 25 | 21 | — |
| Example 32 | 77.2 | 0.8 | " | " | 112 | 103 | 89 | 25 | — |
| Example 33 | 77 | 1.0 | " | " | 111 | 103 | 91 | 72 | 15 |

TABLE 3-continued

| Example No. | Formulation Ny66 | THPB-1 | HTR-2 | MHTR-2 | Izod impact strength 23° C. | 0° C. | -10° C. | -20° C. | -40° C. |
|---|---|---|---|---|---|---|---|---|---|
| | | % by weight | | | | kg · cm/cm | | | |
| Example 34 | 76 | 2.0 | " | " | 99 | 94 | 82 | 60 | 13 |

TABLE 4

| Example No. | Ny66 | EPDM | MEPDM | HTR-1 | MHTR-1 | THPB-2 | THPB-1 | Izod impact strength 23° C. | 0° C. | -10° C. |
|---|---|---|---|---|---|---|---|---|---|---|
| | | | | % by weight | | | | | kg · cm/cm | |
| Comparative Example 7 | 78 | 22 | | | | | | 3.6 | | |
| Example 35 | 68 | 22 | | | | | 10 | 8.1 | | |
| Example 36 | 76 | 22 | | | | | 2 | 9.1 | | |
| Comparative Example 8 | 78 | 18.3 | 3.7 | | | | | 74.0 | 30.7 | 21.3 |
| Example 37 | 77.1 | 18.3 | 3.7 | | | | 0.9 | 79.8 | 64.4 | 19.9 |
| Example 38 | 76.2 | 18.3 | 3.7 | | | | 1.8 | 74.0 | 62.5 | 20.5 |
| Comparative Example 9 | 78 | | 22 | | | | | 4.3 | | |
| Comparative Example 10 | 78 | | 18.3 | 3.7 | | | | 19.1 | 13.2 | 12.1 |
| Example 39 | 77.1 | | 18.3 | 3.7 | | | 0.9 | 98.0 | 84.8 | 25.3 |
| Example 40 | 76.2 | | 18.3 | 3.7 | | | 1.8 | 91.3 | 78.7 | 40.7 |
| Example 41 | 70.5 | | 28 | | | | 1.5 | 24.9 | 18.2 | 10.7 |
| Comaprative Example 11 | 72 | | 25 | 4.5 | | | | 74.0 | 16.3 | 14.0 |
| Example 42 | 70.5 | | 25 | 3 | 1.5 | | | 97.0 | 90.9 | 77.0 |
| Example 43 | 67 | | 25 | 4.5 | | | 3.5 | 85.2 | 84.7 | 71.4 |

| Example No. | Izod impact strength -20° C. | -40° C. | Flexural Strength kg/cm² | Modulus kg/cm² | Dispersed particle (max.) μ | Foliation |
|---|---|---|---|---|---|---|
| Comparative Example 7 | | | | | 22 | observed |
| Example 35 | | | | | 4.2 | not observed |
| Example 36 | | | | | 5.0 | not observed |
| Comparative Example 8 | 15.1 | 14.9 | 690 | 18100 | 10 | observed |
| Example 37 | 16.4 | 14.5 | 700 | 18300 | 2.1 | not observed |
| Example 38 | 16.5 | 14.4 | 700 | 18200 | 1.5 | not observed |
| Comparative Example 9 | | | | | 17 | observed |
| Comparative Example 10 | 10.9 | 7.2 | 690 | 17800 | 12 | observed |
| Example 39 | 16.0 | 14.3 | 720 | 18500 | 1.7 | not observed |
| Example 40 | 16.5 | 14.9 | 710 | 18300 | 1.3 | not observed |
| Example 41 | 8.2 | 6.6 | 670 | 17000 | 3.3 | not observed |
| Comparative Example 11 | 12.5 | 7.4 | 610 | 16000 | 10 | observed |
| Example 42 | 16.1 | 9.1 | 640 | 16800 | 0.9 | not observed |
| Example 43 | 17.4 | 8.5 | 600 | 15900 | 0.9 | not observed |

TABLE 5

| Example No. | Formulation Ny66 | THPB-1 | HTR-2 | MHTR-3 | EP | MEP | Izod impact strength 23° C. | 0° C. | -10° C. | -20° C. | -40° C. | Gelation of strands |
|---|---|---|---|---|---|---|---|---|---|---|---|---|
| | | | % by weight | | | | | | kg · cm/cm | | | |
| Example 44 | 77.2 | 0.8 | 17.6 | 4.4 | | | 111 | 107 | 96 | 75 | 15 | once/4 Hr |
| Example 45 | 77.2 | 0.8 | 13.2 | 8.8 | | | 107 | 104 | 92 | 74 | 14 | once/1 Hr |
| Example 46 | 77 | 1 | 6 | 5 | 9.5 | 1.5 | 109 | 100 | 91 | 75 | 14 | |
| Example 47 | 77 | 1 | 5 | 7.5 | 8.5 | 1 | 112 | 100 | 87 | 53 | 11 | |
| Example 48 | 77 | 1 | 6.6 | 8.8 | 6.6 | 0 | 110 | 102 | 91 | 74 | 11 | |

(Note)
When the amount of MHTR-3 is increased, the obtained composition assumes a brown colour, and when the resin composition is extruded, gelation sometimes occurs so that the formed strands are caused to have protuberances.

TABLE 6

| Example No. | Formulation % by weight | | | | | | Izod impact strength kg·cm/cm |
|---|---|---|---|---|---|---|---|
| | Ny66 | HTR-1 | MHTR-1 | THPB-1 | MHPB | HPB-1 | |
| Comparative Example 12 | 77 | 18.3 | 3.7 | | | | 20 |
| Example 49 | 77 | 18.3 | 3.7 | 1 | | | 103 |
| Comparative Example 13 | 77 | 18.3 | 3.7 | | 1 | | 25 |
| Comparative Example 14 | 77 | 18.3 | 3.7 | | | 1 | 19 |

(Note)
MHPB: Prepared by the addition reaction of a hydrogenated polybutadiene with maleic anhydride in a solvent in the presence of a radical generating agent. The addition ratio is 6% by weight. (obtained in Reference Example 1)
HPB-1: A hydrogenated polybutadiene having a number average molecular weight of 4,500 and having hydroxyl groups at terminals thereof, which was used as a raw material for preparing THPB-1. (tradename: G13000, manufactured by Nippon Soda Co., Ltd., Japan)

TABLE 7

| Example No. | Formulation parts by weight | | | | | Dispersed particle size μm | Compatibility | Mechanical properties | | | Mold flowability |
|---|---|---|---|---|---|---|---|---|---|---|---|
| | Ny66 | Polypropylene | MHTR-1 | THPB-1 | Glass fiber | | | Tensile strength kg/cm² | Tensile elongation % | Weld-line toughness kg/cm² | |
| Example 50 | 70 | 30 | 2 | 1 | — | 3 | ○ | 590 | 22 | 400 | ○ |
| Example 51 | 70 | 30 | 4 | 2 | — | 2 | ○ | 570 | 30 | 400 | ○ |
| Comparative Example 15 | 70 | 30 | 3 | — | — | 10 | △ | 580 | 16 | 350 | △ |
| Comparative Example 16 | 70 | 30 | 12 | — | — | 7 | X | 480 | 28 | 80 | X |
| Comparative Example 17 | 70 | 30 | — | — | — | 43 | X | 530 | 11 | 350 | △ |
| Example 52 | 70 | 30 | 4 | 2 | 53 | — | — | 1,460 | 5 | 410 | ○ |
| Example 53 | 80 | 20 | 5 | 2 | 53 | — | — | 1,570 | 9 | 510 | ○ |

INDUSTRIAL APPLICABILITY

The novel olefin polymer of the present invention, which has a number average molecular weight of 500 to 50,000 and has an acid anhydride group only at a terminal thereof, when blended with a polyamide, is capable of providing a resin composition which is extremely improved in toughness, particularly in tensile elongation as compared to the polyamide alone. Further, when a ternary composition is prepared by blending the olefin polymer of the present invention as component (A), a polyamide as component (B) and an olefin-containing polymer other than the olefin polymer [component (A)] as component (C), component (A) acts as a compatibility agent between component (B) and component (C), so that the efficiency of dispersion of component (C) in component (B), or of component (B) in component (C), is improved, thereby obtaining a resin composition having markedly improved toughness (tensile elongation and impact resistance), LLC resistance and low water absorption properties as compared to the polyamide alone, or obtaining a resin composition having markedly improved heat resistance and gas barrier properties as compared to the olefin-containing polymer alone. These resin compositions according to the present invention are useful as materials for structural members in the fields of, for example, transport machines (automobiles, ships and the like), apparatus, tools, electronic appliances, electric appliances, sports and leisure, or materials for connectors, tubes, containers and the like.

What is claimed is:

1. A polyamide resin composition consisting essentially of:
   (A) an olefin polymer having a number average molecular weight of from 500 to 50,000 and having at least one acid anhydride group, wherein said acid anhydride group is present only at a terminal of the polymer,
   (B) a polyamide, and
   (C) an olefin-containing polymer other than the olefin polymer (A);
   wherein the proportions of components (A), (B), and (C), satisfy the relationships represented by the formulae: $0.01 \leq a \leq 50$, $5 \leq b \leq 99.99$, and $0 \leq c \leq 94.99$,
   wherein a, b and c represent the proportions of components (A), (B) and (C), respectively, expressed in weight % based on the combined weight of components (A), (B) and (C).

2. A thermoplastic polyamide resin composition comprising:
   (A) a liquid olefin polymer having a number average molecular weight of from 500 to 50,000 and having at least one acid anhydride group, wherein said acid anhydride group is present only at a terminal of the polymer,
   (B) a polyamide, and (C) an olefin containing polymer other than the olefin polymer (A);

wherein the proportions of components (A), (B), and (C), satisfy the relationships represented by the formulae: $0.01 \leq a \leq 50$, $5 \leq b \leq 99.99$, and $0 \leq c \leq 94.99$, wherein a, b and c represents the proportions of components (A), (B) and (C), respectively, expressed in weight % based on the combined weight of components (A), (B) and (C).

* * * * *